(12) United States Patent  (10) Patent No.: US 7,958,846 B2
Axelrod et al.  (45) Date of Patent: Jun. 14, 2011

(54) ANIMAL LITTER DEVICE

(75) Inventors: Glen S. Axelrod, Colts Neck, NJ (US);
Barry Askinasi, Mt. Sinai, NY (US)

(73) Assignee: T.F.H. Publications, Inc., Neptune City, NJ (US)

( * ) Notice: Subject to any disclaimer, the term of this patent is extended or adjusted under 35 U.S.C. 154(b) by 41 days.

(21) Appl. No.: 11/093,733

(22) Filed: Mar. 30, 2005

(65) Prior Publication Data

US 2006/0225659 A1  Oct. 12, 2006

(51) Int. Cl.
*A01K 29/00*  (2006.01)

(52) U.S. Cl. .................... 119/169; 119/161; 119/163

(58) Field of Classification Search .......... 119/161–173; D30/161
See application file for complete search history.

(56) References Cited

U.S. PATENT DOCUMENTS

| | | | | |
|---|---|---|---|---|
| 2,432,131 A * | 12/1947 | Shea | | 118/73 |
| 3,071,110 A | 1/1963 | Fox | | 119/22 |
| 3,142,217 A * | 7/1964 | Busse | | 83/375 |
| 3,358,540 A * | 12/1967 | Hall | | 83/455 |
| 3,543,625 A * | 12/1970 | Rowland | | 83/433 |
| 3,626,900 A | 12/1971 | Failla | | 119/1 |
| 3,752,121 A | 8/1973 | Brazzell | | 119/1 |
| 4,011,837 A * | 3/1977 | Ksioszk | | 119/164 |
| 4,337,771 A | 7/1982 | Pieniak et al. | | 128/287 |
| 4,376,365 A * | 3/1983 | Moertel | | 53/555 |
| 4,787,334 A * | 11/1988 | Bassine | | 119/165 |
| 4,800,677 A | 1/1989 | Mack | | 119/1 |
| 4,852,518 A * | 8/1989 | Yananton | | 119/169 |
| 4,869,204 A * | 9/1989 | Yananton | | 119/169 |
| 4,880,420 A * | 11/1989 | Pomparelli | | 604/385.27 |
| 5,031,578 A * | 7/1991 | Hammons et al. | | 119/167 |
| 5,156,640 A | 10/1992 | Del Rosario | | 119/17 |
| 5,289,799 A * | 3/1994 | Wilson | | 119/164 |
| 5,307,717 A * | 5/1994 | Winston | | 83/649 |
| 5,592,900 A * | 1/1997 | Kakuta | | 119/164 |
| 5,715,772 A * | 2/1998 | Kamrath et al. | | 119/169 |
| 5,749,318 A | 5/1998 | Barbot et al. | | 119/166 |
| 6,119,629 A | 9/2000 | Sicchio | | 119/162 |
| 6,378,461 B1 | 4/2002 | Thaler et al. | | 119/166 |
| 6,457,435 B1 | 10/2002 | Bridges | | 119/163 |
| 6,585,713 B1 * | 7/2003 | LeMahieu et al. | | 604/392 |
| 6,588,369 B2 | 7/2003 | Carlisi | | 119/166 |
| 6,701,868 B1 | 3/2004 | Shepherd | | 119/166 |
| 6,802,281 B2 | 10/2004 | Otsuji et al. | | 119/169 |
| 6,827,035 B2 * | 12/2004 | Manera | | 119/166 |

(Continued)

FOREIGN PATENT DOCUMENTS

DE  03534522 A1 *  4/1986
FR  2602643 A1 *  2/1988

OTHER PUBLICATIONS

English Translation of French Patent FR 2602643 A1 to Viet Triem Tong Philippe, Feb. 19, 1988, 16 pages + title page.*

(Continued)

*Primary Examiner* — Andrea M Valenti
(74) *Attorney, Agent, or Firm* — Grossman, Tucker, Perreault & Pfleger, PLLC (57) ABSTRACT

The present invention relates to an automatic device and method for disposing of animal waste. The device and method utilizes an absorbent pad that is automatically advanced and seals upon itself with an adhesive and/or projections to prevent excrement and odors from exiting the roll.

17 Claims, 6 Drawing Sheets

U.S. PATENT DOCUMENTS

2001/0042517 A1* 11/2001 Ikegami et al. ............... 119/161
2002/0139313 A1* 10/2002 Mack et al. ................... 119/165
2004/0065265 A1* 4/2004 Manera ......................... 119/166

OTHER PUBLICATIONS

English Translation, Automated Toilet for Domesticated Animals or Pets, DE 3534522 A1 to Brunmeyr, 15 pages.*

White, Colin. "A look at the Latest Trends and Developments." Internet accessed on Dec. 30, 2004 at http://www.nonwovens-industry.com/jan992.htm (14 pages).

Bockserman, Robert. "Innovations in Polymer Films for Medical Packaging." Medical Plastics and Biomaterials Magazine. Jul. 1996 (7 pages).

* cited by examiner

ANIMAL LITTER DEVICE

FIELD OF INVENTION

The present invention relates to an automatic animal waste disposal device. More specifically, the present invention relates to a device that contains a roll of waste collection material that, after use, may be advanced with the option to self-seal to prevent the spread of odor and increase cleanliness.

BACKGROUND

Pet owners, particularly those who have domesticated dogs, must often take their pets outside so that the pet may urinate and/or defecate. This process may become difficult when the pet owner lives in a confined environment, such as crowded city areas, or lives in an environment that becomes particularly cold during the year. Additionally, the process may also become difficult when the pet owner lacks mobility or is required to be away from the pet during long portions of the day.

It is known to provide a litter box for domesticated animals, particularly felines. In a simple form, litter boxes are boxes that contain a dry absorbent substance, generally known as litter, in which the animal may urinate or defecate. However, litter boxes present a number of problems such as odor, uncleanness (particularly due to handling of litter by owners and tracking of litter by pets) and general difficulties in cleaning out the litter.

Numerous advances have been made to litter boxes to avoid these problems. Examples include but are not limited to the following. U.S. Pat. No. 5,749,318 discloses a litter box which cleans itself automatically, and separates the soiled litter from the clean litter, storing the soiled litter in a receptacle and replacing the consumed litter by clean reserve litter. U.S. Pat. No. 6,119,629 discloses a simplified and easy to use cat litter box comprising an oval support member configured for attachment to the inside surface of a conventional toilet bowl, a removable tray slidably inserted through an opening in the front side of the oval support member which is configured to cover the toilet bowl opening and upon which flushable cat litter is placed during use, and stationary teeth attached to the inside front surface of the oval support member which engage the upper surface of the removable tray as it is slidably withdrawn from the front opening to empty used flushable cat litter directly into the toilet bowl for flushing. U.S. Pat. No. 6,457,435 discloses a pet toilet that has electronic sensing detection devices built within its parallel walls of a housing. U.S. Pat. No. 6,378,461 discloses a self-cleaning litter box for cats employing a comb drive to drive a comb through litter to remove waste from the litter. U.S. Pat. No. 6,701,868 discloses a self-cleaning cat litter box apparatus comprising a litter tray for containing a quantity of cat litter, a waste bin, and a mesh basket sized for having lower regions received into the litter.

U.S. Pat. No. 5,592,900 a portable electromechanical apparatus for easily and hygienically managing and disposing of pet wastes. U.S. Pat. No. 6,827,035 discloses a self-cleaning litter box assembly for litter using pets, which is capable of providing new litter and disposing of soiled litter for extended periods while minimizing human contact.

While these devices certainly contribute to the art of providing a waste collection and disposal devices for pet, there still remains a need for advancement.

It is an object of the present invention to provide a waste collection device that may cleanly disposes of pet waste. It is also an object of the present invention which may also minimize the odors associated with pet waste removal. It is a further object of the present invention to provide a semi-automated method of waste disposal.

SUMMARY

One embodiment of the present invention relates to a waste disposal pad for an animal adapted for use on a feed section and a take up section, comprising an absorbent pad having a first and second surface adapted for use between a feed roll and a take-up roll. The pad includes a surface sealing feature, wherein the first surface of the absorbent pad is adapted to contact the second pad surface when positioned on the take-up roll. The surface sealing feature provides a seal when the first pad surface contacts the second pad surface.

Another embodiment of the present invention relates to a waste disposal device for an animal including a housing having a first and second end sections, and a bottom surface. A feed section is included that is removably and rotatably affixed to the housing at one of the first or second end sections, along with a take-up section removably and rotatably affixed to the housing at one of the first or second end sections; an absorbent pad having a first and second surface between the feed section and the take-up section wherein the pad includes a surface sealing feature. The first surface of the absorbent pad is adapted to contact the second pad surface when positioned on the take-up section; the surface sealing feature providing a seal when the first pad surface contacts the second pad surface.

Another embodiment of the present invention relates to a method for automatic waste disposal comprising providing a take-up section for an absorbent pad having first and second surfaces. The pad includes a surface sealing feature, and wherein the first surface of the absorbent pad is adapted to contact the second pad surface when positioned on the take-up section, the surface sealing feature providing a seal when the first pad surface contacts the second pad surface. Upon take-up of the absorbent pad by the take up section there is contact between the first pad surface to the second pad surface thereby providing a seal.

BRIEF DESCRIPTION OF DRAWINGS

FIG. 14 is a perspective view of another embodiment of the present invention.

DETAILED DESCRIPTION

The present invention relates to providing a semi-automatic disposal of animal waste. In particular, the present invention utilizes a roll of waste collecting material that, once soiled, may be advanced and fastened to minimize odor and increase cleanliness.

Figure 1:
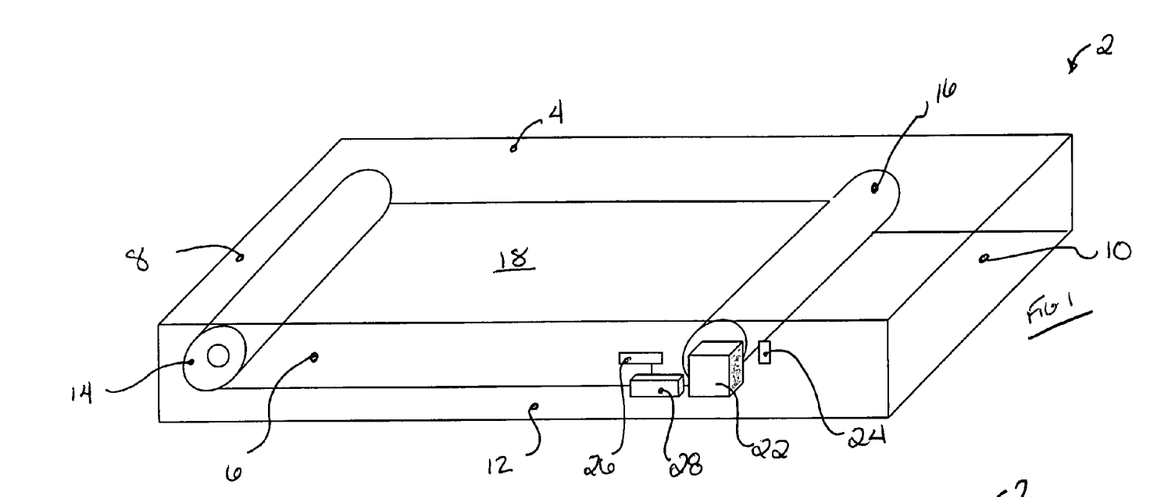
FIG. 1 is a perspective view of an embodiment of the present invention.

Turning to FIG. 1, in one embodiment of the present invention, a housing 2 is provided. The housing may have a plurality of side walls 4, 6 and a front and back wall, 8 and 10, respectively, as well as a bottom surface 12. The housing may contain a feed roll 14 and a take up roll 16 of absorbent pad 18. The rolls may be rotatably and removably seated inside of the housing 2.

It should be understood that while a feed roll and take up roll are illustrated other means to provide and remove the absorbent sheet are contemplated. For example, the absorbent pad may be provided from a feed section that may be among other things a folded stack and collected into a secondary folded stack.

Preferably, take up roll 16 may have a reduced diameter near at or near the center portion of the roll to accommodate for animal waste that is isolated between the layers of the absorbent pad. Furthermore, take up roll 16 may be rotatated by a motor 22 located in proximity to the take up roll 16. However, a manual crank may also present to turn the take up roll 16 in case of lost power or due to preference of the pet owner.

Motor 22 may be actuated by a manual switch 24 or it may be actuated by a sensor 26 connected to a microprocessor 28 which is connected to the motor 22. The manual switch may be presented upon the side (as illustrated) or on a portion of the housing and made easily accessible. Once the sensor has been triggered, a signal is sent to a microprocessor 28 to trigger a logic series or other mechanism, such as a simple timing device, that determines whether it is necessary to actuate motor 22.

Triggering and placement of the sensor and operation of the logic series could be operated by steps or devices known to a person of ordinary skill in the art. Preferably the sensors contemplated in the present invention may include, but would not be limited to, weight/pressure sensors, moisture sensors, optical sensors or motion sensors. Also preferably, the actuation of the motor in the present invention contemplates the detection and accommodating for the departure of the animal from the absorbent pad prior to take up of the absorbent pad. This would prevent the pet from being startled, and it may ensure the pet's safety, when utilizing the subject device.

Figure 2:
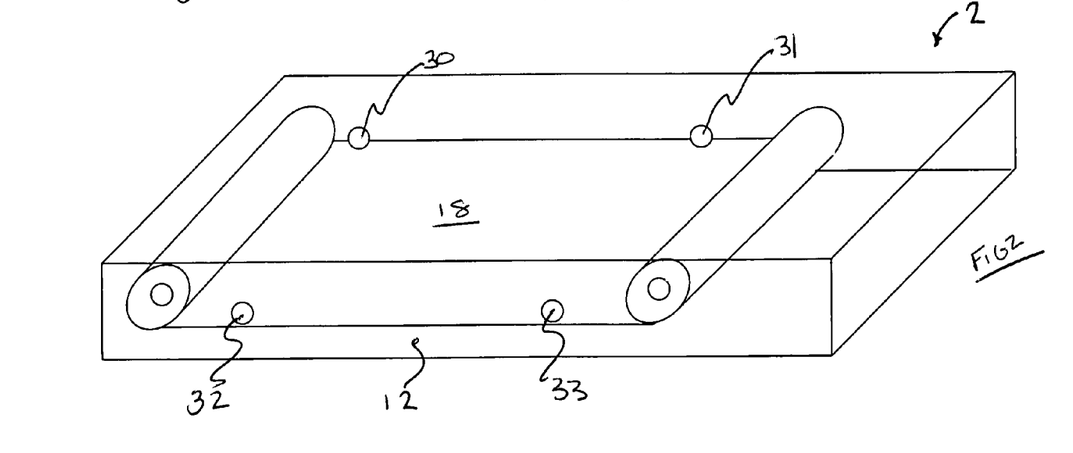
FIG. 2 is a perspective view of another embodiment of the present invention.

FIG. 2 depicts in perspective view the use of guide rollers 30, 31, 32, 33, to guide the absorbent material 18 along the bottom surface 12 of the housing 2. These rollers may be placed at opposing locations, for example two near each edge of the absorbent material proximate to the feed roll 14 and two near each edge of the absorbent material proximate to the take up roll 16. However, it should be appreciated that multiple configurations of the guide rollers are contemplated in the present invention. The guide rollers therefore may, among other things, function to maintain absorbent material 18 at or near the bottom surface 12 of the container.

Figure 3:
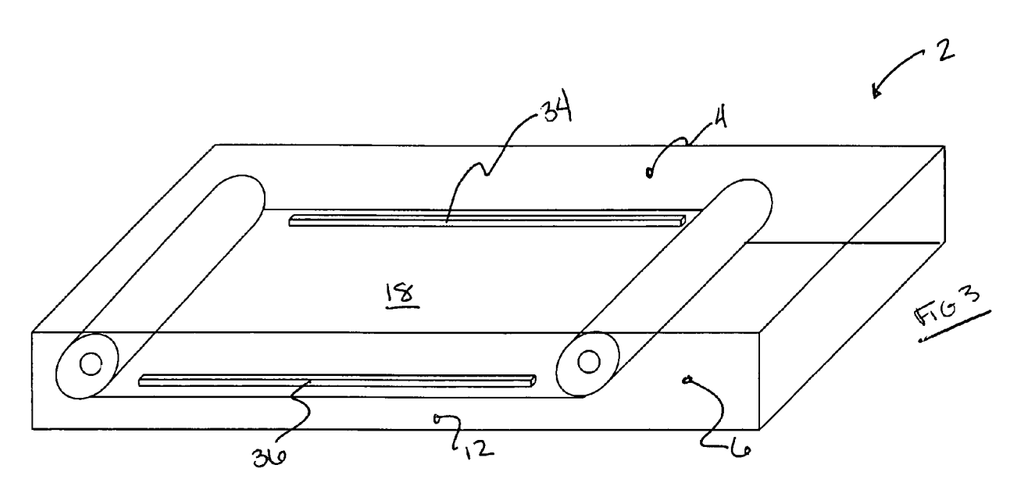
FIG. 3 is a perspective view of another embodiment of the present invention.
Figure 4:
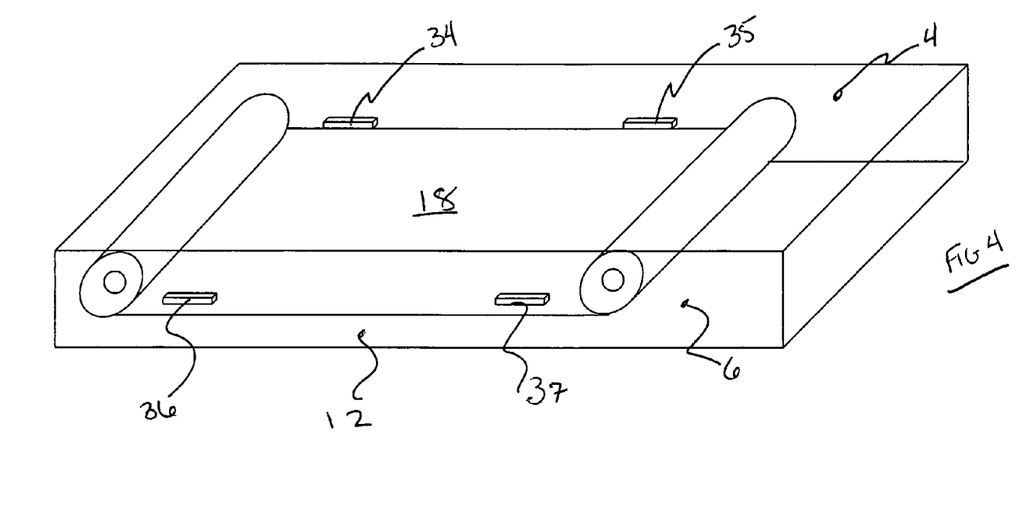
FIG. 4 is a perspective view of another embodiment of the present invention.

Instead of guide rollers 30, 31, 32, 33, a series of guide strips 34, 36 may be used to maintain the absorbent material 18 near the bottom surface 12 of the housing 2, as depicted in FIG. 3. The guide strips 34, 36 may be a single strip located on each side 4, 6 of the housing 2, seen in FIG. 3, or may be multiple strips 34, 35, 36, 37 at spaced locations, seen in FIG. 4.

Figure 5:
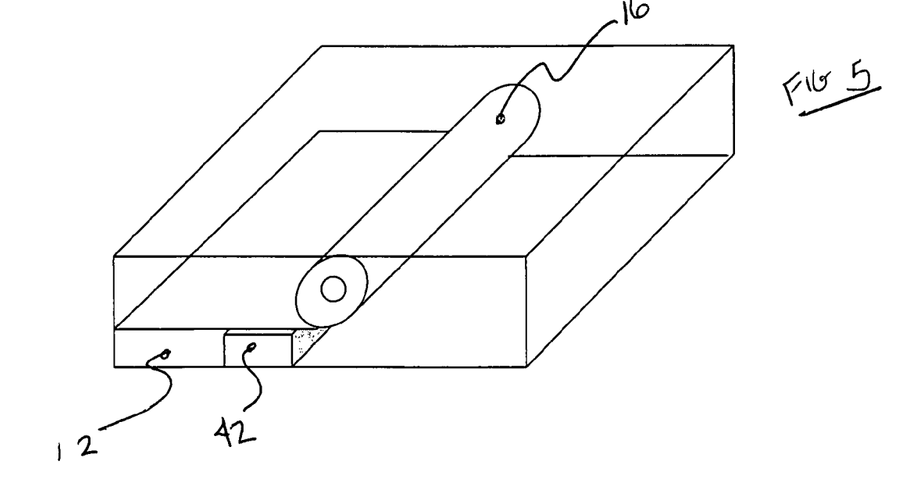
FIG. 5 is a perspective view of another embodiment of the present invention.
Figure 6:
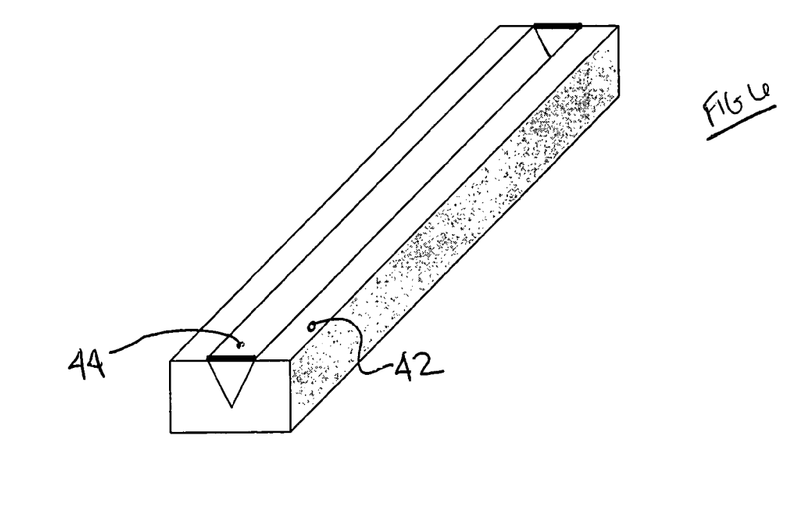
FIG. 6 is a close up perspective view of an aspect of the embodiment of FIG. 5.

Furthermore, as seen in FIG. 5, a surface 42 may be provided upon which a cutting device may-travel. The surface 42 may be provided proximate the take up roll 16 near the bottom surface 12. The surface 42 may include a groove 44 and illustrated in FIG. 6 to accommodate the blade of a cutting device in which the cutting device may travel.

Figures 7, 8:
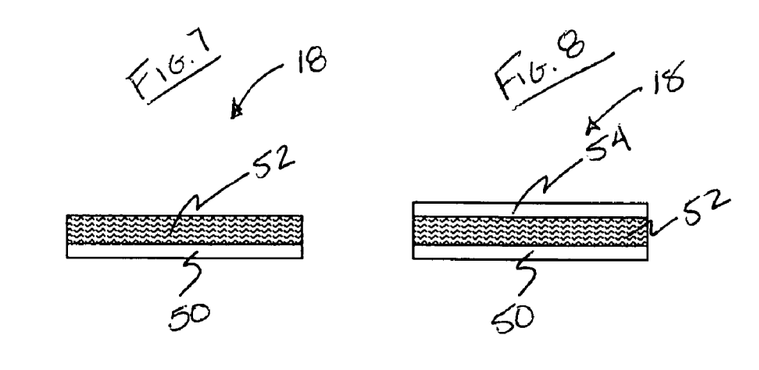
FIG. 7 is a cross sectional view of an embodiment of the absorbent material of the present invention.
FIG. 8 is a cross sectional view of another embodiment of the absorbent material of the present invention.
Figure 9:
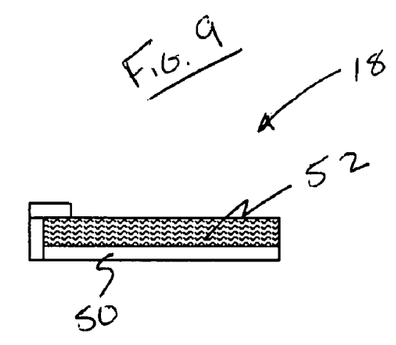
FIG. 9 is a cross sectional view of another embodiment of the absorbent material of the present invention.

As seen in FIG. 7, preferably, the absorbent pad 18 has a moisture barrier layer 50 and an absorbent layer 52. Optionally, additional layers may be contemplated on top of or in between the layers to aid in the absorption and retention of the both the liquid and solid waste material such as including a moisture permeable facing 54 as seen in FIG. 8. Furthermore, depicted in FIG. 9, the moisture barrier layer 50 may be used to bind the edges of the absorbent pad 18 so as to border (as shown) the absorbent layer 52 and any other layer included in the absorbent pad.

As noted above, the present invention employs a pad that includes a surface sealing feature, wherein said first surface of said absorbent pad is adapted to contact said second pad surface when positioned on said take-up roll and the surface sealing feature provides a seal when the first pad surface contacts the second pad surface. It should be understood that reference to providing a seal broadly includes simply engaging of the first and second pad surfaces, such that solid waste, e.g., is only-physically trapped within the absorbent pad surfaces. Alternatively the seal may be such that the surfaces of the pad are sealed airtight, such that the waste is completely sealed from the surrounding environment.

Figure 10:
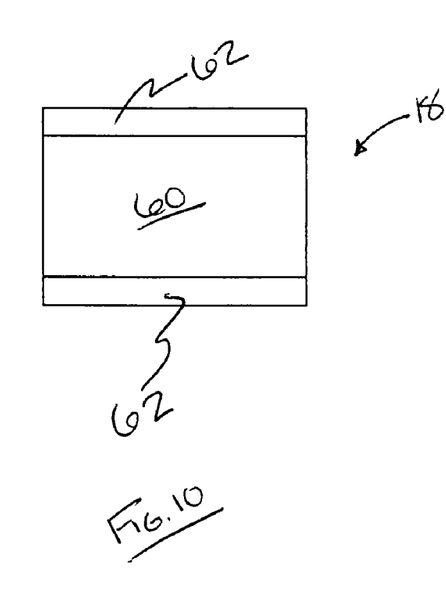
FIG. 10 is a top view of another embodiment of the absorbent material of the present invention.

As seen in FIG. 10, which shows a top view of the pad, the absorbent pad 18 may have two edge portions. The first edge portion 60 of the absorbent pad 18 and the second edge portion 62. These edge portions may be designed to assist in sealing the absorbent pad 18 as it is rolled up on the take up roll 16. It can also be appreciated that such edge portions may appear on either the top or bottom surface of the pad 18.

Figures 11, 12, 13:
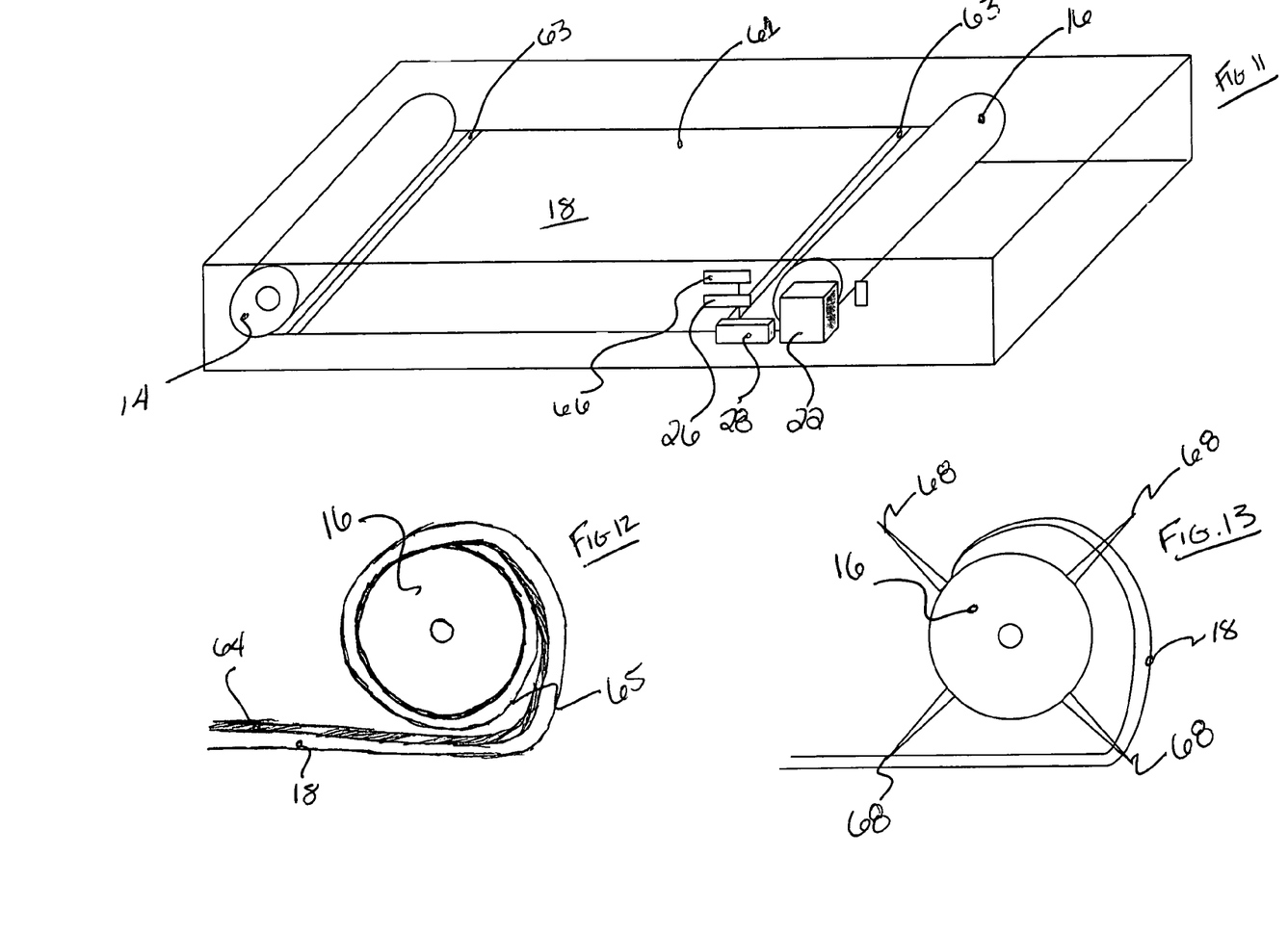
FIG. 11 is a perspective view of another embodiment of the present invention.
FIG. 12 is a cross sectional view of another embodiment of the present invention.
FIG. 13 is a cross sectional view of another embodiment of the present invention.
Figure 11:
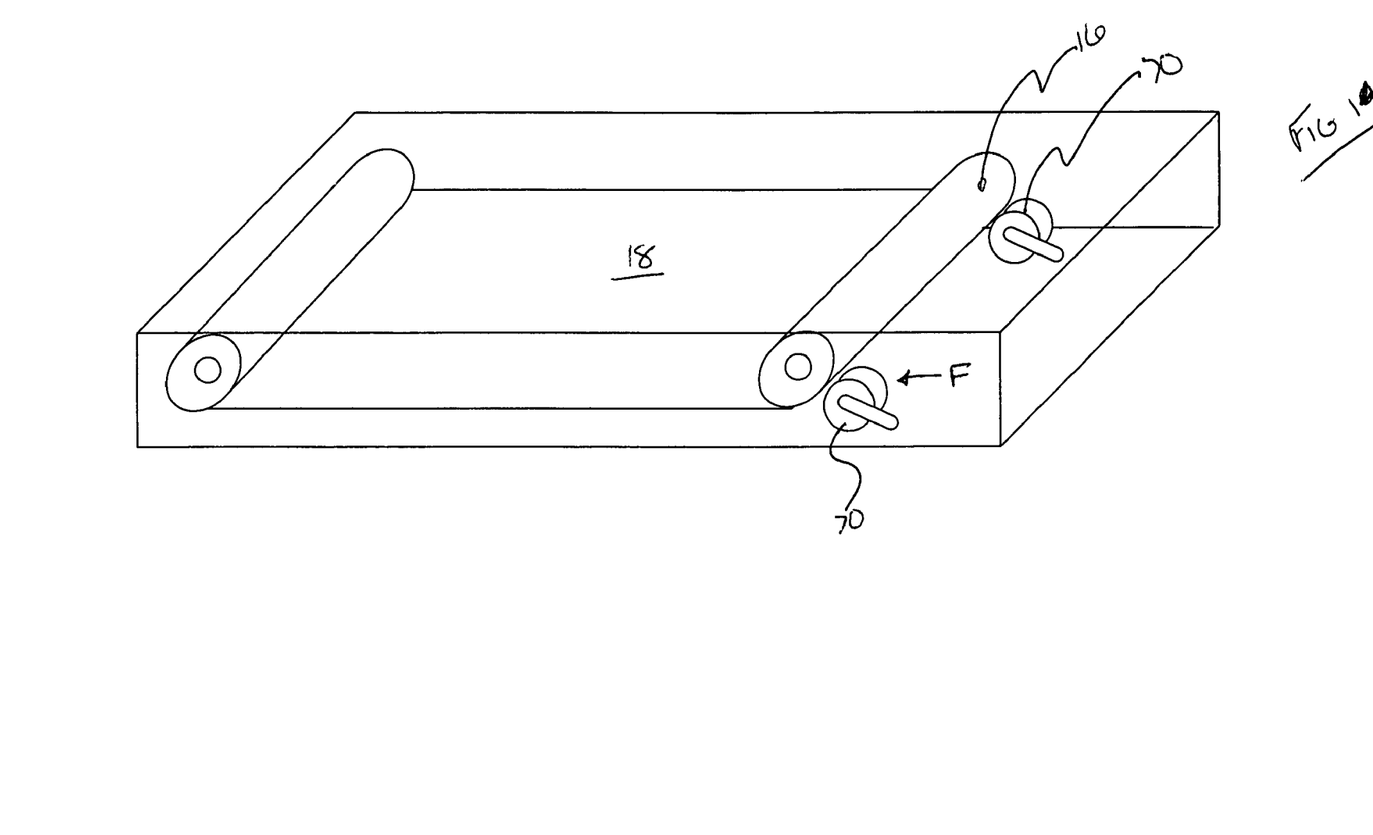

By way of example as to how the roll layers may be sealed together using second portion 62, which contains a coating of adhesive 64, and with attention directed to FIG. 12, when one rolls up the second or edge portion 62 with adhesive 64, the adhesive will bind with an opposing rolled-up portion of the absorbent pad, which will occur generally at 65. Alternatively, it can be appreciated that the second portion 62 may simply be greater in thickness than the first portion 60 of the absorbent pad 18 to accommodate for increased in volume of the absorbent pad 18 due to carrying or absorption of the animal excrement.

Furthermore the pad may include portion 61, which may also comprise an adhesive or thicker cross-section at 63, to assist in sealing the pad on the take-up roll 16. These section 63 may be located at spaced intervals along the length of the absorbent pad 18. See FIG. 11. Accordingly, as the pad 18 is advanced the section 63 is preferably located perpendicular to the edges. It can be appreciated that the features 62 (see FIG. 10) and 63 (see FIG. 11) may also include other configurations such as a plurality of such surface sealing features disposed on the absorbent pad. In this manner, when the pad is rolled up on the take-up roll, and plurality of surface sealing surfaces are allowed to come in contact with the absorbent and thereby provide enhanced sealing of an odor-causing waste. Preferably, the absorbent pad may be described as having a length and a width, wherein the width is defined by two edges, and the surface sealing feature is located at an angle intersecting the edges.

Figure 10A:
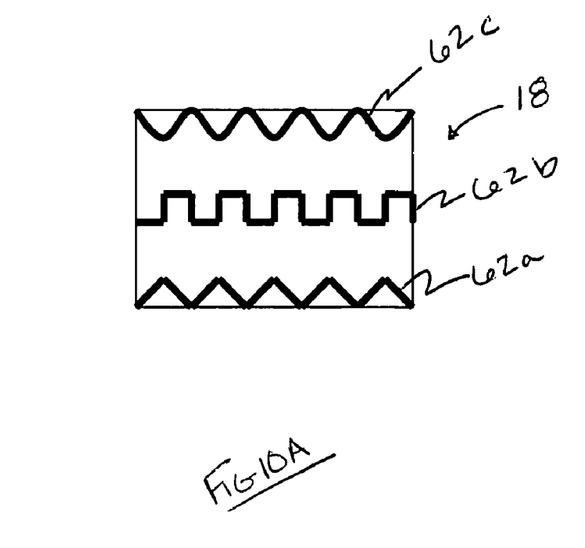

In addition, the surface sealing feature may be of different geometries, such as a planar zig-zag, sawtooth, sinusoidal, or other geometric patterns, running along with width or length of the absorbent pad. See FIG. 10A which illustrates a zig-zag 62a, sawtooth 62b or sinusoidal configuration 62c for the surface sealing feature To properly locate the features 63 in a relation relative to the feed roll 14 and take up roll 16 a secondary sensor 66 may be used to turn off the motor 22 once the feature 63 of the absorbent pad 18 has reached a desired location, wherein the features 63 does not interfere with the animal when the animal contacts the pad 18. The secondary sensor 66 may also be connected to the motor 22 or microprocessor 28. Triggering and placement of the secondary sensor 66 and operation of the logic series could be operated by steps or devices previously described herein.

Another example as to how the roll layers may be sealed together is illustrated in FIG. 13. In this embodiment the take up roll 16, may have a plurality of projections 68. which may appear along the entire length of the roll, or at spaced intervals on the roll. As the absorbent pad 18 is advanced onto the take up roll 16, the projections 68 pierce the absorbent pad 18, lodging the absorbent pad 18 onto the take up roll 16. Used alone or in combination with the adhesive 64, prevents seepage of any excrement through the absorbent pad 18 when on the take up roll 16.

Furthermore, as illustrated in FIG. 14, a pressure roll 70, or multiple pressure rolls, may be provided to exert a force, F, upon the absorbent pad 18. The pressure roll 70 may be self adjusting to accommodate the diameter of the absorbent pad 18 upon the take up roll 16. Such force, used alone or optionally in combination with an adhesive 64 (FIG. 12) or at spaced intervals between projections on the roll illustrated in FIG. 13, provide another technique to seal the absorbent pad on the take-up roll 16.

Turning to the absorbent pad described herein. The absorbent pad may be a substantially rectangular piece of absorbent material that may be wound about a feed roll. Generally, the absorbent pad may comprise a moisture proof barrier and an absorbent layer. However, the absorbent pad may be a single layer of absorbent material.

The absorbent layer may be composed of an absorbent fabric such as, a nonwoven or woven material, sheets of paper, wood fluff or other-absorbent materials. Furthermore, granular super absorbent polymer may be incorporated into the absorbent pad.

The moisture barrier layer may be composed of a waterproof paper, a synthetic resin material or a metal foil. In the case where the moisture barrier layer is composed of a synthetic resin material, the resin material may be a polyolefin such as polypropylene or a polyethylene (including high density polyethylene, low density polyethylene and linear low density polyethylene), polyvinyl chloride, polyamide or polystyrene. Furthermore, the moisture barrier layer may be composed of multiple thermoplastic material layers, wherein the additional layer may comprise any of the previously mentioned material as well as ethylene vinyl acetate or cellophane.

In addition, the absorbent and/or the such moisture barrier layer may contain three-dimensional features to accommodate the waste volume collected on the pad after utilized by the animal. In other words, the features provide a recess in the surface of the pad such that the recess itself provides a volume for waste to collect and more evenly distribute over the pad surface.

Furthermore, a deodorizer or an attractant scent may be incorporated into or onto the absorbent or moisture proof layer. The deodorizer may help to control odors and the attractant may be used to attract the pet to use the absorbent pad for a litter area. In one preferred embodiment, a deodorizer is incorporated into the moisture barrier layer which may contain more than one synthetic resin layer.

In one embodiment in which the moisture barrier layer is a polymeric film layer, the moisture barrier layer may be extruded. However, other methods are contemplated, such as calendaring or blown film extrusion or cast film. In another embodiment, where there are multiple layers of a barrier film, the layers of the film may be co-extruded or laminated together.

Additional layers may be included in the absorbent pad. In one embodiment a top sheet layer may be provided to prevent the absorbent layer from becoming caught in the animal's paws. This may apply in those situations where the pad has a loft and can lend itself to becoming attached to the claw of an animal. The top sheet may also be a nonwoven or woven material of thermoplastic or organic material.

In further embodiment, an adhesive may be disposed between the moisture barrier layer and the absorbent layer or disposed between any additional layers that may be utilized to form a multi-layer absorbent pad construction. Materials that may be used in the top sheet of the absorbent pad include spunbonded polyolefins, spunbond/melt blown/spunbond polyolefins and carded polyolefins. Preferably, the polyolefin may be polypropylene or polyethylene (including high density polyethylene, low density polyethylene and linear low density polyethylene.) In that sense, the invention herein recognizes the advantage of providing a hydrophobic polymer at or near the surface, such that the animal waste is naturally transported into the inner regions of the pad, which may contain more hydrophilic type polymer material. This then provides a pad construction that may provide less odor after the pad has been utilized.

A housing may be formed to cover the feed roll and take up roll of the absorbent material leaving only a selective portion of the absorbent material for use by the animal. Furthermore, the housing may be formed to cover the edge portions of the absorbent pad so that if, for example, an adhesive is disposed on the edge portions of the pad (see again FIG. 10) the animal will avoid contact with such adhesive surface.

The foregoing description is provided to illustrate and explain the present invention. However, the description hereinabove should not be considered to limit the scope of the invention set forth in the claims appended here to.

What is claimed is:

1. A waste disposal pad and device for an animal comprising: a feed section including a feed roll and a take up section including a take up roll;

an absorbent pad having a first and second surface adapted for use between said feed section and said take-up section wherein said pad further includes a portion having a surface sealing feature, and wherein said first surface of said absorbent pad is adapted to contact said second pad surface when positioned on said take-up section;

said surface sealing feature providing a seal when said first pad surface contacts said second pad surface on said take up roll, wherein said absorbent pad itself has a cross-sectional thickness, and said surface sealing feature of said pad has a cross-sectional thickness and where the cross-sectional thickness of said sealing feature and the pad is greater than said pad cross-sectional thickness;

wherein said pad comprises a top sheet layer, an inner region absorbent layer and a moisture barrier layer, wherein said top sheet layer includes a woven hydrophobic polyolefin polymer and said inner region includes a hydrophilic polymer wherein animal waste is transported from said polyolefin polymer to said hydrophilic polymer within said pad;

wherein said absorbent layer contains three dimensional features providing recesses in said first surface providing a volume to collect said waste; and wherein said absorbent pad has a length and a width, the width defined by two edges, and said surface sealing feature comprises an adhesive pattern along said length and at spaced intervals across the entirety of said width to define a region having a length and a width that is sealed along said length and width when the pad is rolled on the take-up roll, said pattern selected from the group consisting of zig-zag, sawtooth, sinusoidal or mixtures thereof;

wherein said take up roll has ends and a center portion, said ends having a first diameter and said center portion having a second diameter, where said second diameter is less than said first diameter.

2. The waste disposal pad of claim 1, wherein said absorbent pad has a length and a width, said width defined by two edges, and said surface sealing feature is located at an angle intersecting said edges.

3. The waste disposal pad of claim 1, wherein said pad includes a plurality of surface sealing features.

4. The waste disposal pad of claim 1, wherein said moisture barrier layer is selected from the group consisting of waterproof paper, synthetic resin material, metal foil and combinations and layers there of.

5. The waste disposal pad of claim 4, wherein said synthetic resin material is selected from the group consisting of polyolefin, polyvinyl chloride, polyamide, polystyrene, ethylene vinyl acetate, cellophane and mixtures thereof.

6. The waste disposal pad of claim 1, wherein said absorbent layer is selected from the group consisting of a nonwoven material, woven material, sheets of paper, wood fluff, super absorbent polymer and combinations thereof.

7. The waste disposal pad of claim 1, further comprising additives selected from the group consisting of a deodorizer, an attractant and combinations thereof.

8. The waste disposal pad of claim 1, wherein said moisture barrier layer covers the edges of the absorbent layer.

9. A waste disposal device for an animal comprising:
a housing having a first feed section and a second take up end section, and a bottom surface;
a feed roll removably and rotatably affixed to said housing at said first end section;
a take-up roll removably and rotatably affixed to said housing at second end section, wherein said take up roll and said feed roll rotate in the same directions;
wherein said take up roll has ends and a center portion, said ends having a first diameter and said center portion having a second diameter, where said second diameter is less than said first diameter;
an absorbent pad having a first and second surface movable between said feed roll and said take-up roll wherein said pad includes a surface sealing feature, and wherein said first surface of said absorbent pad is adapted to contact said second pad surface when positioned on said take-up roll;
said surface sealing feature providing a seal when said first pad surface contacts said second pad surface wherein said absorbent pad itself has a cross-sectional thickness, and said surface sealing feature of said pad has a cross-sectional thickness and where the cross-sectional thickness of the sealing feature and the pad is greater than said pad cross-sectional thickness;
wherein said absorbent pad has a length and a width, the width defined by two edges, and said surface sealing feature comprises an adhesive pattern along said length and at spaced intervals across the entirety of said width to define a region having a length and a width that is sealed along said length and width when the pad is rolled on the take-up roll;
wherein said absorbent pad comprises an absorbent layer that contains three dimensional features providing recesses in said first surface providing a volume to collect said waste;
wherein said take up section further includes a surface including a groove in which a cutting device travels; and
wherein said take-up section further includes one or more pressure rolls and said one or more pressure rolls engage and seal said first pad surface by contact to said second pad surface at said edges of said absorbent pad on said take-up roll,
said device further comprising a plurality of guides wherein said guides maintain said absorbent pad proximate to said bottom surface.

10. The device of claim 9 further comprising a motor in communication with said take-up section.

11. The device of claim 10 further comprising:
a microprocessor in communication with said motor;
a sensor in communication with said microprocessor.

12. The device of claim 11, wherein said sensor is selected from the group consisting of weight, pressure, moisture, optical, and motion sensors and combinations there of.

13. The device of claim 11 further comprising a secondary sensor in communication with said microprocessor, whereby said secondary sensor detects the position of the absorbent pad.

14. The device of claim 10 further comprising a manual switch in communication with said motor to operate said motor.

15. The device of claim 9 wherein said guides are selected from the group consisting of rollers, strips or combinations thereof, wherein said guides maintain said absorbent pad proximate to said bottom surface.

16. The device of claim 9 wherein said take up roll comprises a surface and a plurality of projections disposed on said surface.

17. A method for automatic waste disposal comprising:
providing a device including a feed section including a feed roll and a take up section including a take up roll, and a bottom surface;
providing an absorbent pad having a first and second surface adapted for use on said take-up roll wherein said pad includes a surface sealing feature, and wherein said first surface of said absorbent pad is adapted to contact said second pad surface when positioned on said take-up roll, said surface sealing feature providing a seal when said first pad surface contacts said second pad surface;
rotating said take up roll and said feed roll in the same direction;
advancing said absorbent pad onto said take up roll;
contacting said first pad surface to said second pad surface;
providing a seal;
wherein said absorbent pad itself has a cross-sectional thickness, and said surface sealing feature of said pad has a cross-sectional thickness and where the cross-sectional thickness of the sealing feature and the pad is greater than said pad cross-sectional thickness; wherein said absorbent pad has a length and a width, and said surface sealing feature comprises an adhesive pattern along said length and at spaced intervals across the entirety of said width to define a region having a length and a width that is sealed along said length and width when the pad is rolled on the take-up roll,
wherein said absorbent pad comprises an absorbent layer that contains three dimensional features providing recesses in said first surface providing a volume to collect said waste;
wherein said take up section further includes a surface including a groove in which a cutting device travels;
wherein said device further comprises a plurality of guides wherein said guides maintain said absorbent pad proximate to said bottom surface; and
wherein said take-up section further includes one or more pressure rolls and said one or more pressure rolls engage and seal said first pad surface by contact to said second pad surface at said edges of said absorbent pad on said take-up roll,
wherein said take up roll has ends and a center portion, said ends having a first diameter and said center portion having a second diameter, where said second diameter is less than said first diameter.

* * * * *